(12) United States Patent
Yang et al.

(10) Patent No.: US 7,189,013 B2
(45) Date of Patent: Mar. 13, 2007

(54) LATCH TYPE OPTICAL MODULE

(75) Inventors: Kwang Jin Yang, Suwon-si (KR); Dae Jin Kim, Suwon-si (KR); Do Ik Kim, Goyang-si (KR)

(73) Assignee: Optoelectronics Solutions Co., Ltd., Gwangju (KR)

( * ) Notice: Subject to any disclaimer, the term of this patent is extended or adjusted under 35 U.S.C. 154(b) by 118 days.

(21) Appl. No.: 10/999,447

(22) Filed: Nov. 29, 2004

(65) Prior Publication Data

US 2005/0117855 A1   Jun. 2, 2005

(30) Foreign Application Priority Data

Nov. 27, 2003   (KR) .................. 10-2003-0084991

(51) Int. Cl.
*G02B 6/36* (2006.01)
*H05K 7/00* (2006.01)
*H05K 5/00* (2006.01)
*H01R 13/62* (2006.01)
*H01R 13/625* (2006.01)
*H01R 4/50* (2006.01)

(52) U.S. Cl. .................. 385/92; 385/88; 439/299; 439/300; 439/338; 439/341; 439/342; 439/345; 439/346; 361/728; 361/747; 361/752; 361/759

(58) Field of Classification Search ............ 385/88–94; 439/299, 300, 338, 341, 342, 345, 346; 361/728, 361/747, 752, 759
See application file for complete search history.

(56) References Cited

U.S. PATENT DOCUMENTS

| 6,929,403 B1* | 8/2005 | Arciniegas et al. .......... 385/55 |
| 2003/0198025 A1* | 10/2003 | Cao .......................... 361/728 |
| 2004/0033027 A1* | 2/2004 | Pang et al. ................... 385/53 |
| 2005/0117854 A1* | 6/2005 | Chiu et al. .................... 385/92 |
| 2006/0118942 A1* | 6/2006 | Schmidt ..................... 257/700 |

* cited by examiner

*Primary Examiner*—Brian Healy
*Assistant Examiner*—Derek L. Dupuis
(74) *Attorney, Agent, or Firm*—Jordan and Hamburg LLP

(57) ABSTRACT

A latch type optical communication module is easily mounted to and detached from a system port having a cage by means of a latch. The optical communication module is provided with a latch. The latch is rotated around a hinge shaft fixed to both sides of a receptacle and engaging latch holes of ends of the latch. When rotated the latch moves latch drivers to force a slider upward, the slider raises a groove engaging a fixing tap of the optical communication module thereby allowing the optical communication module to be detached from the system port. The optical communication module can be detached from the system port without a tool or influence or adjacent an optical communication module.

13 Claims, 6 Drawing Sheets

"PRIOR ART"

"PRIOR ART"

"PRIOR ART"

LATCH TYPE OPTICAL MODULE

BACKGROUND OF THE INVENTION

1. Field of the Invention

The present invention relates to a latch type optical communication module, and more particularly, to a latch type optical communication module, designed to be easily mounted to and detached from cage of a system port by means of a latch.

2. Description of the Related Art

According to a conventional technology for mounting and detaching an optical communication module from a system port, when mounting the optical communication module to the system port, a triangular fixing tap on the bottom of a conventional Small Form-factor Plug-in (SFP) module is inserted into a triangular fixing groove of a cage provided to the system port, and when detaching the optical communication module from the system port, the optical communication module is generally detached from the system port by use of a hand or an additional means.

However, with such a conventional technology, if several optical communication modules are densely connected to the system port, one of the optical communication modules contacts adjacent optical communication modules upon detachment of the optical communication module, thereby providing an influence on the characteristics of the other optical communication modules.

In this regard, problems of the conventional technology will be described in detail with reference to a conventional plug-in optical transceiver module shown in FIGS. 5 to 7.

FIG. 5 shows a conventional plug-in optical transceiver module according to a conventional release mechanism.

Referring to FIG. 5, the conventional plug-in optical transceiver module has a certain release member A20 mounted thereon. The release member A20 is fitted into a slit A18 formed from a front surface A14 of the optical transceiver module into the optical transceiver module, and slides along the slit A18 with some portion of the release member A20 exposed on one surface A11 of the optical transceiver module.

However, in the case of the conventional plug-in optical transceiver module having the release member A20, it can be removed from a receptacle 30 (shown in FIG. 7) of a host apparatus by pulling lateral sides A12 of the optical transceiver module, each having a uneven grip surface A12a formed thereon, while forcing a certain tool into a recess A22 or A24 of the release member A20.

In the construction of the conventional plug-in optical transceiver module shown in FIG. 5, there are problems in that not only is it uncomfortable to detach the optical transceiver module from the receptacle 30 of the host apparatus, but it is also difficult to detach the optical transceiver module therefrom without the tool.

Accordingly, the plug-in optical transceiver module shown in FIG. 5 requires a driver in order to detach the optical transceiver module from the host apparatus, thereby providing drawbacks of increasing installation time and costs of an optical communication apparatus as well as maintenance time and costs thereof.

FIG. 6 shows another conventional plug-in optical transceiver module having a rotational lever, which is suggested to solve the above described problems of the conventional plug-in optical transceiver module.

Referring to FIG. 6, the plug-in optical transceiver module having the rotational lever has a rotational lever P50 hingeably coupled to a front side of the optical transceiver module P10 by means of a hinge P51. A receptacle P12 has a base P24, side contacts P20, and a folded portion P26 defined in part by slots, of which slit P28 is most visible, and having a lip P30. Accordingly, when detaching the optical transceiver module having the rotational lever from the host apparatus, the rotational lever P50 is rotated in the counterclockwise direction from a lower side to an upper side of the optical transceiver module, and then a wedge P36 is moved under the folded portion P26 of the receptacle P12 by a sliding member P35, causing a fixing tap P32 of the optical transceiver module to retract from a slot P22, and allow the optical transceiver module to be removed with a hand.

However, the plug-in optical transceiver module having the rotational lever shown in FIG. 6 has a drawback in that a plurality of components must be assembled to the optical transceiver module, as shown in FIG. 6, in order to achieving the above described release mechanism.

Specifically, the conventional plug-in optical transceiver module having the rotational lever comprises the plurality of components, such as the wedge P36, a base member supporting the wedge P36, a flexible member for connecting the base member and the lever P50 in a stretchable fashion, a shaft connected to the flexible member, and the rotational lever P50 integrally formed to the shaft.

Accordingly, since the conventional plug-in optical transceiver module shown in FIG. 6 comprises the plurality of components for the release structure, there are drawbacks not only of difficulty in manufacturing the optical transceiver module, but also of an increase in manufacturing costs and component costs thereof.

FIG. 7 shows still another conventional plug-in optical transceiver module having a release member, which is suggested to solve the problems of the conventional plug-in optical transceiver module shown in FIGS. 5 and 6.

Referring to FIG. 7, another conventional plug-in optical transceiver module 100 having the release member is shown which plugs into a receptacle 30. The receptacle 30 has contacts 31 and a base plate 32 having an elastic member 34 defined in part by slots, of which slit 35 is one. The transceiver module 100 has a first surface 11 with a wedge 22, and a wing 26, an open end 11b, a lateral side 12, and a front side 14 with a slit 18 and ports 19a and 19b.

When the optical transceiver module 100 is inserted into the receptacle 30, a fixing tap 16 on the first surface 11 of the optical transceiver module 100 slides under a lip 38 of an elastic member 34. The fixing tap 16 has a slant surface 17 in order to allow the optical transceiver module 100 to be more smoothly slid under the lip 38. Furthermore, the fixing tap 16 and a slot 36 have a triangular shape, and a size for tightly fixing the fixing tap 16 and the slot 36 to each other, whereby the optical transceiver module 100 can be tightly fixed to the receptacle 30.

On the contrary, when detaching the optical transceiver module 100 from the receptacle 30, a release member 20 is advanced in the longitudinal direction of the optical transceiver module 100, thereby allowing a wedge 22 having a slant surface to slide under the lip 38 of the elastic member 34. Then, the fixing tap 16 is retracted from the slot 36 by virtue of an operation of the wedge 22. In this state, as grips 26a and other grips 12a of a wing 26 are pulled backward, the optical transceiver module 100 is removed from the receptacle 30.

However, the conventional optical transceiver module 100 shown in FIG. 7 also has a drawback in that it has influences on the adjacent module in achieving the above described release mechanism.

That is, the conventional optical transceiver module 100 shown in FIG. 7 has the similar construction to that of the convention optical module as shown in FIG. 5, and are densely connected to the system port, thereby providing the influences on the characteristics of the optical communication module.

As described above, the conventional optical transceiver modules shown in FIGS. 5 to 7 have the problems in that it is necessary to provide a certain tool when detaching the optical transceiver module from the host apparatus, the plurality of components used in the optical transceiver module causes the manufacturing thereof to be difficult and increases the manufacturing costs thereof, and in that negative influences are applied against the adjacent modules upon mounting and detaching the optical transceiver module.

SUMMARY OF THE INVENTION

The present invention has been made to solve the above problems, and it is an object of the present invention to provide a latch type optical communication module, which allows for significantly easier mounting and detachment of the optical communication module without a tool for detachment, can be manufactured at low costs by removing a necessity of manufacturing a plurality of components, and which does not have influences or adjacent modules upon mounting and detaching the optical communication module.

In accordance with an aspect of the present invention, the above and other objects can be accomplished by the provision of a latch type optical communication module inserted into a system port and fixed by a cage of the system port, comprising: a housing partially surrounding a printed circuit board electrically cooperated with a system; a master having a receptacle provided at a front end of the master, the receptacle including a hinge shaft fixed to both sides of the receptacle in a longitudinal direction, latch control pins respectively fixed to both sides of the receptacle while being slightly spaced from the hinge shaft, and a fixing tap fixed to an upper surface of the receptacle; a slider moving along a recess of the upper surface of the receptacle, and including a pair of L-shaped wings bent at both ends of an upper surface of the housing and extended along both sides of the housing, respectively, when being mounted on the housing; and a C-shaped latch hingeably coupled to the hinge shaft, and including latch drivers formed at both ends of the latch and latch holes which the hinge shaft is inserted through.

The latch may be rotated around the hinge shaft, which is fixed to both sides of the receptacle and inserted into the latch holes penetrating both ends of the latch, and when the latch is rotated and then allows the latch drivers to force the slider along, the slider raises a fixing groove member engaging the fixing tap of the optical communication module inserted into the system port, thereby allowing the optical communication module to be detached from the system port.

The latch may be controlled in rotation by means of the latch control pins such that, when the latch is rotated, the latch cannot pass through a plane of a bottom surface of the optical communication module, and the slider driven by the latch may move along the recess without moving vertically, thereby allowing the optical communication module to be detached from the system port.

With the construction of the optical communication module as described above, the plurality of additional components are not required for the optical communication module, thereby lowering manufacturing costs, and the optical communication module can be detached from the system port without any tool or influence against the adjacent optical communication modules.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Preferred embodiments will now be described in detail with reference to the accompanying drawings.

Figure 1:
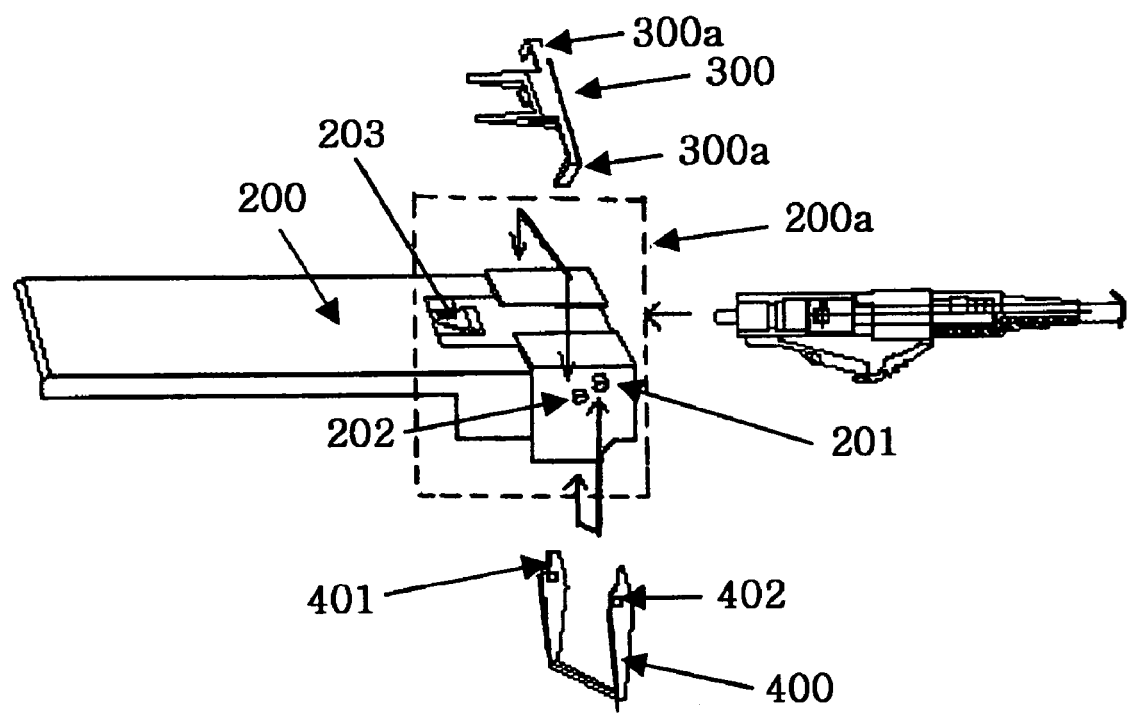
FIG. 1 is an exploded perspective view of an optical communication module according to one embodiment of the present invention.
Figure 2:
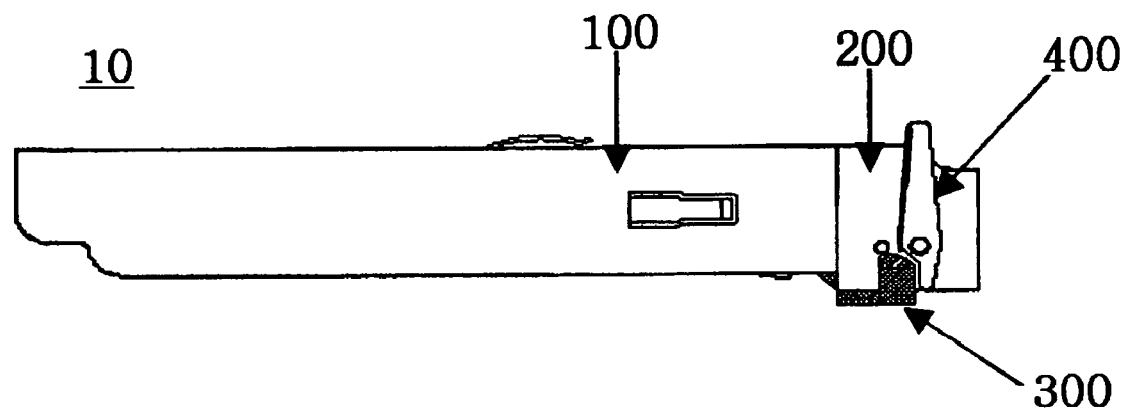
FIG. 2 is an assembled side view of the optical communication module in accordance with one embodiment of the present invention, in which the optical communication module is mounted on housing.
Figure 3:
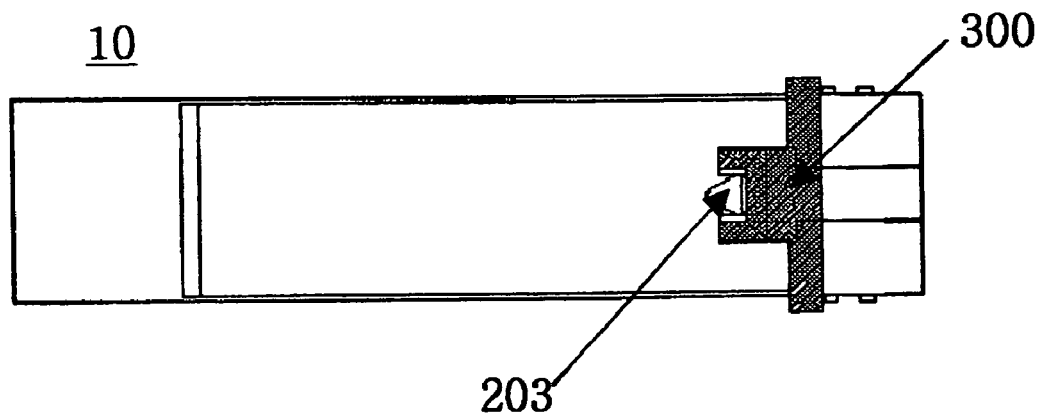
FIG. 3 is an assembled bottom view of the optical communication module in accordance with one embodiment of the present invention, in which the optical communication module is mounted on the housing.
Figure 4:
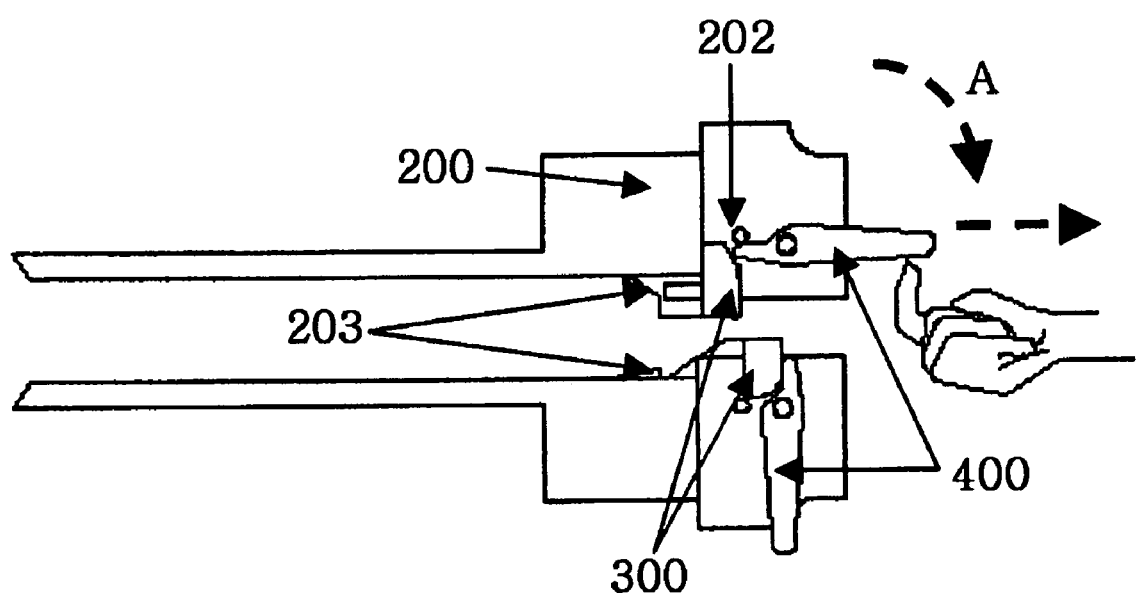
FIG. 4 is a diagram illustrating an operation for detaching the optical communication module in accordance with one embodiment of the present invention assembled to another optical communication module by use of a latch.
Figure 5:
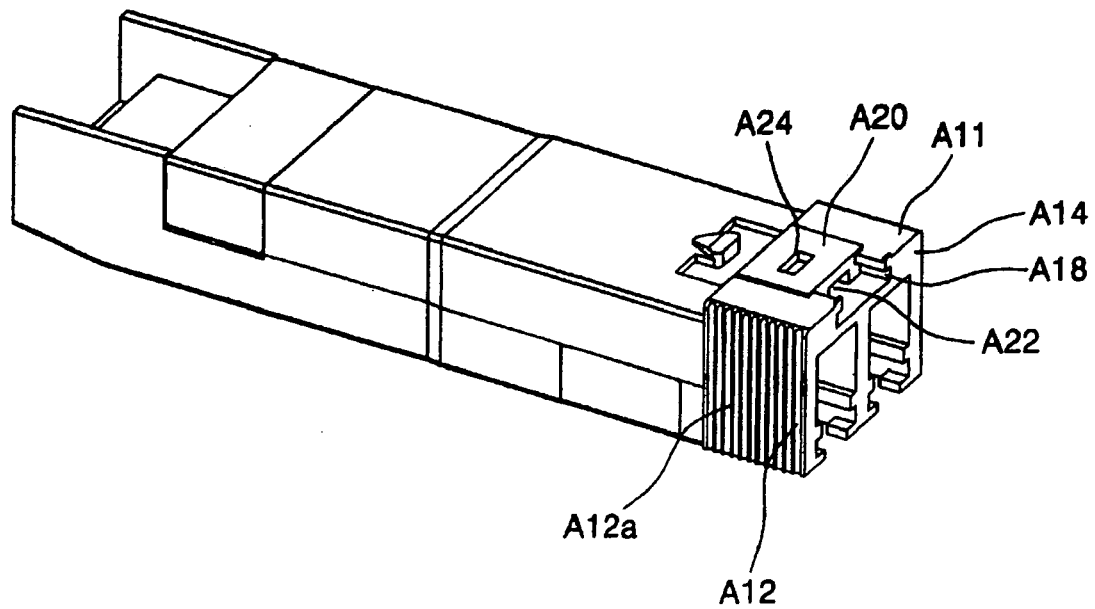
FIG. 5 is an assembled perspective view of a conventional optical transceiver module having a release member.

FIG. 1 is an exploded perspective view of an optical communication module according to one embodiment of the invention. FIG. 2 is an assembled side view of the optical communication module in accordance with one embodiment of the invention, in which the optical communication module is mounted on housing. FIG. 3 is an assembled bottom view of the optical communication module in accordance with one embodiment of the invention, in which the optical communication module is mounted on the housing. FIG. 4 is a diagram illustrating an operation for detaching the optical communication module in accordance with one embodiment of the invention assembled to another optical communication module by use of a latch.

Referring to FIGS. 1 to 3, a latch type optical communication module 10 according to the invention comprises a housing 100 partially surrounding a printed circuit board electrically cooperated with a system, a master 200 having a receptacle 200a provided at the front end of the master 200 for connection to a connector. The receptacle 200a is mounted to the optical communication module 10 and carries the printed circuit board mounted thereon. A slider 300 moves along a recess of an upper surface of the receptacle 200a.

In the construction of the optical communication module 10, the receptacle 200a provided at the front end of the master 200 comprises a hinge shaft 201 fixed to both sides of the receptacle 200a in a longitudinal direction, latch control pins 202 respectively fixed to both sides of the receptacle while being slightly spaced from the hinge shaft 201, and a fixing tap 203 fixed to the upper surface of the receptacle 200a of the master 200.

The slider 300 moves along the recess of the upper end of the receptacle 200a provided at the front end of the master 200, and comprises a pair of L-shaped wings 300a and 300a, which are bent at both ends of an upper surface of the housing 100 and extended along both sides of the housing 100, respectively, when being mounted on the housing 100.

The optical communication module 10 of the invention further comprises a C-shaped latch 400 hingeably coupled to the hinge shaft 201 fixed to both sides of the receptacle 200a. The latch 400 comprises latch drivers 401 formed at both ends of the latch 400, and latch holes 402 provided at both sides of the latch 400 to allow the hinge shaft 201 to be inserted therethrough and to enable the latch 400 to be rotated around the hinge shaft 201.

Operations for mounting and detaching the optical communication module according to the invention from a system port will now be described in detail with reference to FIG. 4.

As shown in FIG. 4, when the optical communication module 10 is advanced toward the system port (not shown) in order to mount the optical communication module 10 to the system port, the fixing tap 203 fixed on the upper surface of the receptacle 200a of the master 200 is latched to a fixing groove of the cage provided to the system port, so that the optical communication module 10 can be easily mounted to the system port.

As shown in FIGS. 1 and 4, the latch 400 is coupled to the hinge shaft 201, which is fixed to both sides of the receptacle positioned at the front end of the master 200 and inserted through the latch holes 402. When detaching the optical communication module 10 from the system port, the latch 400 is lowered toward an optical fiber (indicated by the arrow A), and it applies a force via the latch drivers 401 formed at both ends of the latch 400a to the slide 300 to move the slide 300 along the recess toward the fixing tap 203.

Figure 6:
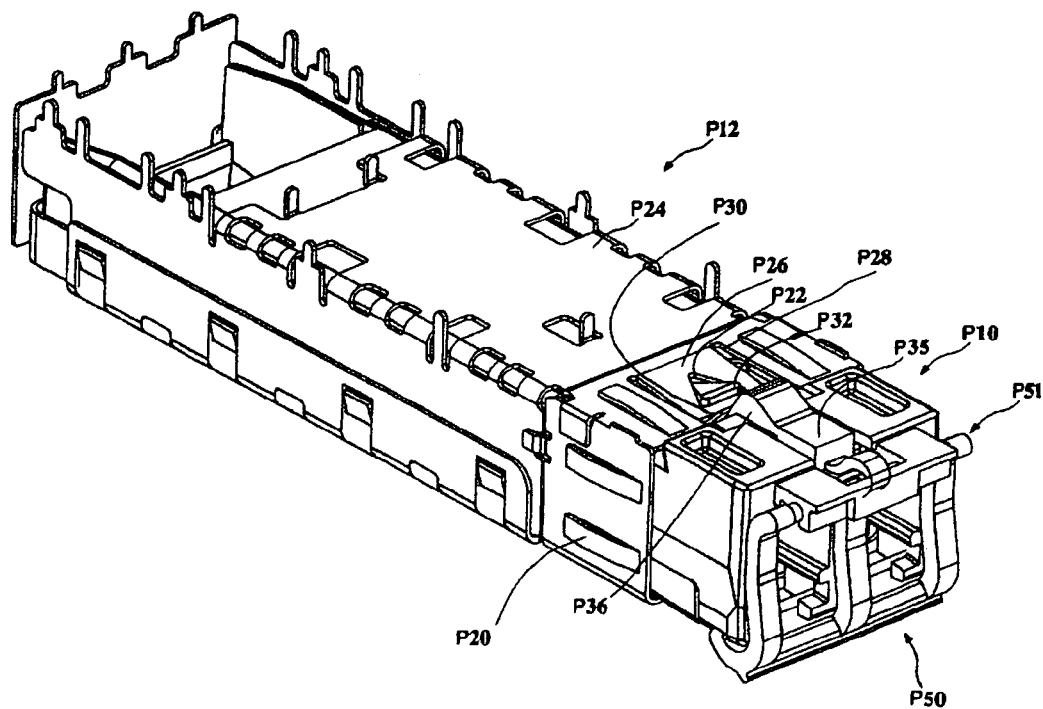
FIG. 6 is an assembled perspective view of another conventional optical transceiver module having a rotational lever.
Figure 7:
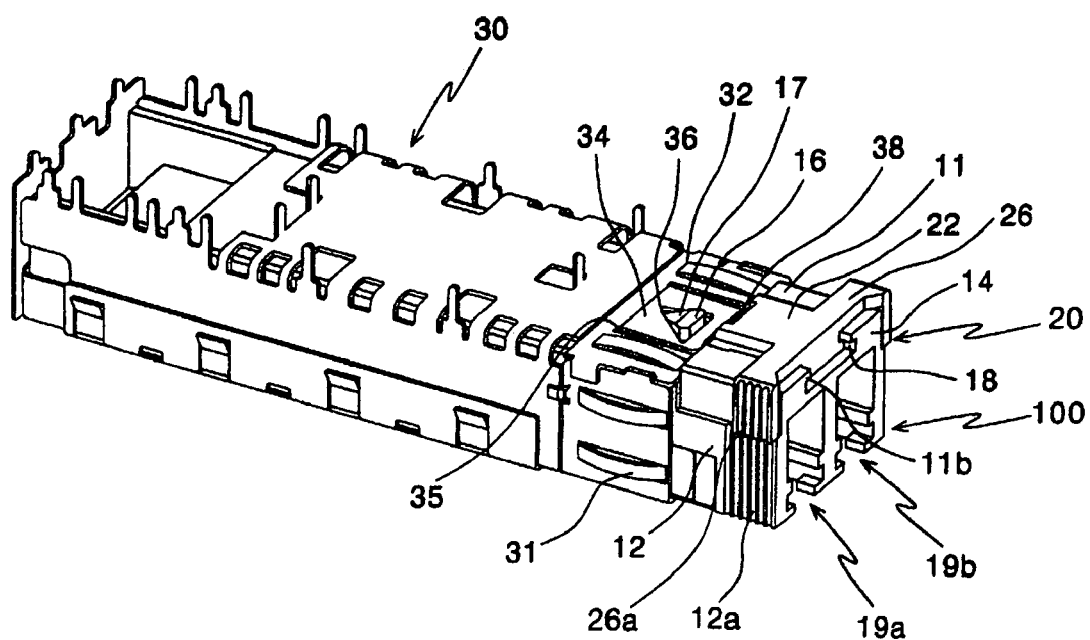
FIG. 7 is an assembled perspective view of still another conventional optical transceiver module having the release member.

At this time, while moving along the recess toward the fixing tap 203, the slide 300 raises a fixing groove of the cage, corresponding to the slots P22 and 36 of FIGS. 6 and 7, latching the fixing tap 203, and releases locking between the fixing groove and the fixing tap 203, thereby allowing the optical communication module 10 to be detached from the system port.

Meanwhile, as described above, when being lowered in the direction of the arrow A in order to detach the optical communication module 10 from the system port, the latch 400 is restricted in rotation by means of the latch control pins 202 in order to prevent the latch 400 from being further lowered below the bottom surface of the optical communication module 10. As a result, as shown in FIG. 4, in the case where multiple optical communication modules 10 are vertically positioned adjacent to each other to the system port, since the latch 400 of each optical communication module 10 can be operated within a space defined by the associated optical communication module 10, the optical communication module 10 does not interfere with the other optical communication module 10 upon mounting and detaching the optical communication module 10, thereby enhancing the reliability between the optical communication modules.

That is, in the optical communication module 10 of the present invention, the latch 400 may be rotated around the hinge shaft 201 fixed to both sides of the receptacle 200a and inserted into the latch holes 402 penetrating both ends of the latch 400, and when the latch 400 is rotated and allows the latch drivers 401 to force the slider 300 along, the slider 300 may raise the fixing groove engaging the fixing tap 203 of the optical communication module 10 inserted into the system port, thereby allowing the optical communication module 10 to be detached from the system port.

As apparent from the description, according to the present invention, the plurality of additional components are not required for the optical communication module, thereby lowering the manufacturing costs, and the optical communication module can be detached from the system port without any tool or influence the adjacent optical communication module.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A latch type optical communication module inserted into a system port and fixed by a fixing groove member of a cage of the system port, comprising:

a housing partially surrounding an optical device and a printed circuit board electrically cooperated with a system;

a master having a receptacle provided at a front end of the master, the receptacle including a hinge shaft fixed to both sides of the receptacle in a longitudinal direction, latch control pins respectively fixed to both sides of the receptacle while being slightly spaced from the hinge shaft, and a fixing tap fixed to an upper surface of the receptacle;

a slider moving along a recess of the upper surface of the receptacle, and including a pair of L-shaped wings bent at both ends of an upper surface of the housing and extended along both sides of the housing, respectively, when being mounted on the housing; and a C-shaped latch hingeably coupled to the hinge shaft, and including latch drivers formed at both ends of the latch and latch holes which the hinge shaft is inserted through.

2. The optical communication module as set forth in claim 1, wherein the latch is rotated around the hinge shaft fixed to both sides of the receptacle while being inserted into the latch holes penetrating both ends of the latch, and when the latch is rotated and then allows the latch drivers to force the slider along so that the slider raises the fixing groove member disengaging the fixing groove member from the fixing tap of the optical communication module inserted into the system port, thereby allowing the optical communication module to be detached from the system port.

3. The optical communication module as set forth in claim 1 or 2, wherein the latch is controlled in rotation by means of the latch control pins such that, when the latch is rotated, the latch cannot pass through a plane defined by a bottom surface of the optical communication module, and the slider driven by the latch moves along the recess without moving vertically, thereby allowing the optical communication module to be detached from the system port.

4. A connector for insertion into a cage of a port having a deflectable slotted member for engaging the connector, the connector comprising:

a housing having a first housing side with a portion configured for insertion into said cage, said portion having a fixing tap protruding therefrom and engageable by said deflectable slotted member, said housing further having opposing second and third housing sides, and a front housing side;

a sliding member slidably disposed on said first housing side and configured to deflect said slotted member out of engagement with the fixing tap when the sliding member is slid from a first sliding member position, whereat said deflectable slotted member engages said fixing tap, to a second sliding member position whereat said deflectable slotted member is deflected by said sliding member out of engagement with said fixing tap;

said sliding member having opposing ends with first and second side arms respectively extending therefrom and disposed along said second and third housing sides; and a latch member including first and second latch side members respectively rotatably mounted to said second and third housing sides and configured to move said first and second side arms so as to move said sliding member between said first and second sliding member positions when said latch member is respectively rotated between a first latch position and a second latch position.

5. The connector according to claim 4 wherein said first and second latch side members each rotate about a latch axis and each have first lever sides connected to each other by a latch cross member, and second lever sides on sides of said latch axis opposite said first lever sides, and said second lever sides engage said first and second side arms to move said sliding member.

6. The connector according to claim 5 further comprising stop members respectively disposed on said second and third opposing sides of said housing and positioned to arrest further rotation of said latch member past said second latch position whereat said latch member positions said sliding member at said second sliding member position.

7. The connector according to claim 6 wherein said stop members engage said second lever sides.

8. The connector according to claim 4 further comprising stop members respectively disposed on said second and third opposing sides of said housing and positioned to arrest further rotation of said latch member past said second latch position whereat said latch member positions said sliding member at said second sliding member position.

9. A connector system comprising:
a connector;
a cage defining a port for receiving said connector, said cage having a deflectable slotted member for engaging the connector; and
said connector comprising:
a housing having a first housing side with a portion configured for insertion into said cage, said portion having a fixing tap protruding therefrom and engageable by said deflectable slotted member, said housing further having opposing second and third housing sides, and a front housing side;

a sliding member slidably disposed on said first housing side and configured to deflect said slotted member out of engagement with the fixing tap when the sliding member is slid from a first sliding member position, whereat said deflectable slotted member engages said fixing tap, to a second sliding member position whereat said deflectable slotted member is deflected by said sliding member out of engagement with said fixing tap;

said sliding member having opposing ends with first and second side arms respectively extending therefrom and disposed along said second and third housing sides; and a latch member including first and second latch side members respectively rotatably mounted to said second and third housing sides and configured to move said first and second side arms so as to move said sliding member between said first and second sliding member positions when said latch member is respectively rotated between a first latch position and a second latch position.

10. The connector system according to claim 9 wherein said first and second latch side members each rotate about a latch axis and each have first lever sides connected to each other by a latch cross member, and second lever sides on sides of said latch axis opposite said first lever sides, and said second lever sides engage said first and second side arms to move said sliding member.

11. The connector system according to claim 10 further comprising stop members respectively disposed on said second and third opposing sides of said housing and positioned to arrest further rotation of said latch member past said second latch position whereat said latch member positions said sliding member at said second sliding member position.

12. The connector system according to claim 11 wherein said stop members engage said second lever sides.

13. The connector system according to claim 9 further comprising stop members respectively disposed on said second and third opposing sides of said housing and positioned to arrest further rotation of said latch member past said second latch position whereat said latch member positions said sliding member at said second sliding member position.

* * * * *